United States Patent
Liao

(10) Patent No.: US 9,764,752 B2
(45) Date of Patent: Sep. 19, 2017

(54) COMPACT WHEELED CARRIER DEVICE WITH MOVABLE, STOWABLE REAR WHEELS AND FRAME

(71) Applicant: UNIQUE PRODUCT & DESIGN CO., LTD., Tainan (TW)

(72) Inventor: Gordon Liao, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 0 days.

(21) Appl. No.: 14/577,530

(22) Filed: Dec. 19, 2014

(65) Prior Publication Data
US 2016/0176427 A1 Jun. 23, 2016

(51) Int. Cl.
*B62B 3/00* (2006.01)
*B62B 3/02* (2006.01)
*B62B 3/12* (2006.01)
*B62B 7/06* (2006.01)
*B62B 7/04* (2006.01)

(52) U.S. Cl.
CPC ............... *B62B 3/025* (2013.01); *B62B 3/02* (2013.01); *B62B 3/12* (2013.01); *B62B 7/044* (2013.01); *B62B 7/06* (2013.01); *B62B 2205/12* (2013.01)

(58) Field of Classification Search
CPC .. B62B 3/025; B62B 3/12; B62B 3/00; B62B 3/02; B62B 3/04; B62B 3/102; B62B 3/106; B62B 5/04; B62B 5/0433; B62B 5/0485; B62B 5/06; B62B 5/064; B62B 5/067; B62B 7/06; B62B 7/044; B62B 2202/404
See application file for complete search history.

(56) References Cited

U.S. PATENT DOCUMENTS

| | | | | |
|---|---|---|---|---|
| 6,758,481 B2 * | 7/2004 | Blomgren | ................ | B62B 1/04 280/47.26 |
| 6,863,297 B2 * | 3/2005 | Shapiro | .................. | B62B 1/206 280/642 |
| 6,886,852 B2 * | 5/2005 | Cheng | .................... | B62B 1/045 280/47.26 |
| 7,000,939 B2 * | 2/2006 | Shapiro | .................... | B62B 3/02 280/642 |
| 7,128,333 B2 * | 10/2006 | Reimers | ................ | B62B 1/045 280/651 |
| 7,137,644 B2 * | 11/2006 | Kimberley | ............... | B62B 3/12 280/651 |
| 7,147,242 B2 * | 12/2006 | Wu | ......................... | B62B 3/12 280/641 |
| 7,581,748 B2 * | 9/2009 | Reimers | ............... | B62B 5/0026 280/651 |

(Continued)

*Primary Examiner* — James M Dolak
(74) *Attorney, Agent, or Firm* — Stephen J. Weyer, Esq.; Stites & Harbison, PLLC

(57) ABSTRACT

A wheeled cart includes a number of unique methods to synchronously stow all of the rear wheels of a fold flat, compact wheeled cart device without removing any of the wheels themselves and the innovations are applicable to cargo carriers, golf bag carts, trolleys, baby strollers, and other devices for moving cargo. In alternative designs, the folding motion of either the forward wheel frame, or the swiveling motion of the rear wheel frame, or both, synchronously setup or stow the cart's at least two rear wheels to achieve an ultra-thin stowed profile, orienting all the cart's wheels in a co-planar stowed relationship, closely parallel with all other parts.

19 Claims, 10 Drawing Sheets

(56) References Cited

U.S. PATENT DOCUMENTS

| | | | |
|---|---|---|---|
| 7,591,479 B2* | 9/2009 | Golias | B62B 3/12 |
| | | | 280/47.38 |
| 8,282,121 B2* | 10/2012 | Lin | B62B 3/02 |
| | | | 280/47.34 |
| 8,366,140 B2* | 2/2013 | Wu | B62B 3/02 |
| | | | 280/651 |
| 8,439,390 B2* | 5/2013 | Zhang | B62B 3/02 |
| | | | 280/47.34 |
| 8,517,411 B2 | 8/2013 | Martin | |
| 8,770,514 B2 | 7/2014 | Brighton et al. | |
| 8,820,775 B2* | 9/2014 | Wang | B62B 5/0433 |
| | | | 280/42 |
| 8,820,776 B2* | 9/2014 | Wang | A63B 55/08 |
| | | | 280/641 |
| 9,346,478 B2* | 5/2016 | Kimberley | B62B 5/0433 |
| RE46,150 E* | 9/2016 | Liao | B62B 3/02 |
| 9,469,322 B2* | 10/2016 | Du Toit | B62B 5/0033 |
| 9,469,326 B2* | 10/2016 | Pearce | B62B 7/10 |
| 9,555,822 B2* | 1/2017 | Rauch | B62B 5/0043 |
| 2006/0071434 A1* | 4/2006 | Cheng | B62B 3/12 |
| | | | 280/47.26 |
| 2006/0267303 A1* | 11/2006 | Golias | B62B 3/02 |
| | | | 280/47.34 |
| 2010/0052275 A1* | 3/2010 | Reimers | B62B 3/022 |
| | | | 280/47.26 |
| 2011/0074134 A1* | 3/2011 | Wang | B62B 3/02 |
| | | | 280/646 |
| 2011/0215542 A1* | 9/2011 | Wang | B62B 3/02 |
| | | | 280/35 |

* cited by examiner

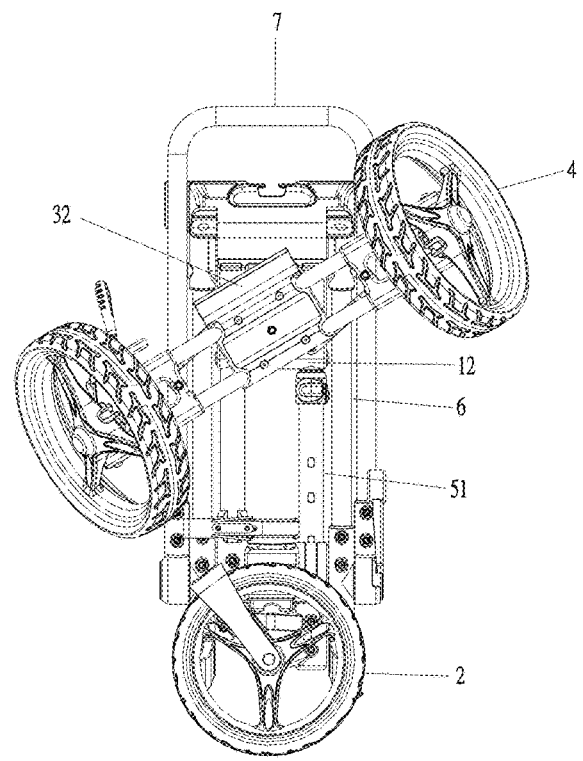
Fig. 12
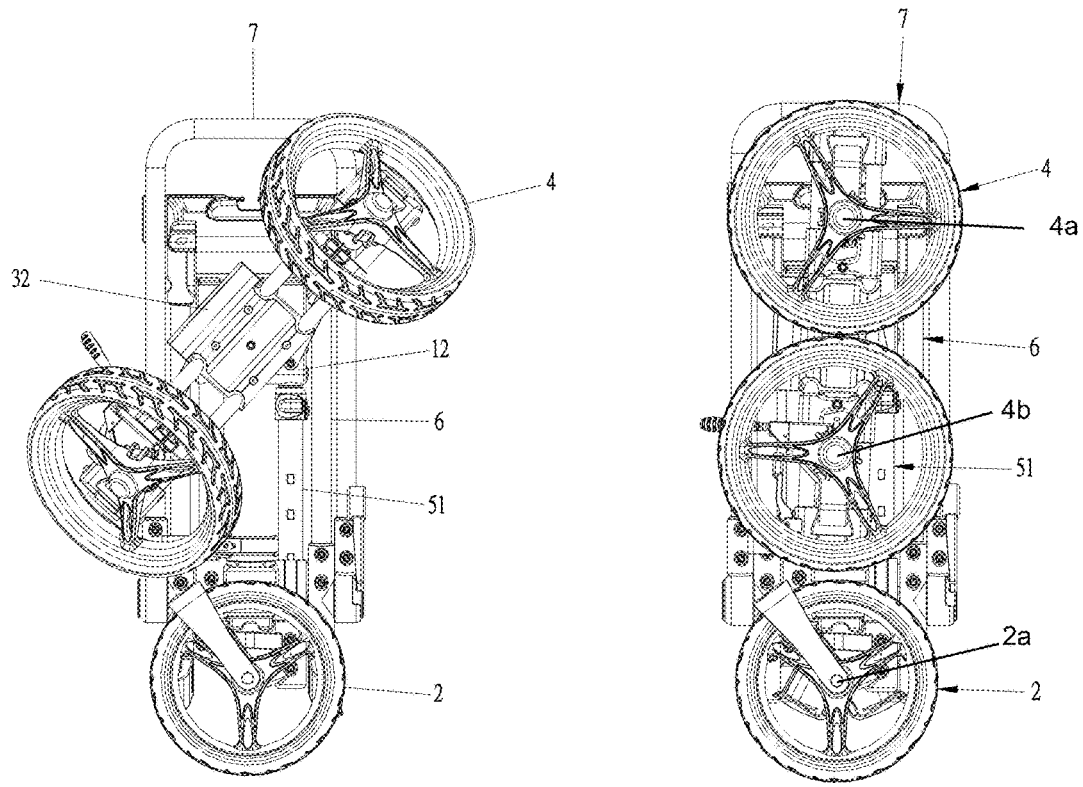
Fig. 13
Fig. 14 ately folding of at least two rear wheels by virtue of at least one gear that synchronously caused movement and stowing of at least two rear wheels when a portion of the wheeled carrier device frame was folded. This application builds on the concept of synchronously folding at least two rear wheels of a wheeled carrier device, however; the synchronous folding of the at least two rear wheels is accomplished by either: 1) a unique swiveling motion of the rear wheel frame in relation to the forward

COMPACT WHEELED CARRIER DEVICE WITH MOVABLE, STOWABLE REAR WHEELS AND FRAME

RELATIONSHIP TO OTHER APPLICATIONS

This application relates to wheeled carts and carrier devices and particularly to wheeled cargo carrying devices, for transporting general cargo, luggage, golf bags, or for functioning as a baby stroller. Although this applicant has numerous previous patents within this field of art, this is not a continuation in part of any previous application by the inventor.

FIELD OF THE INVENTION

This application relates to fold flat, compact components for wheeled carts and provides for convenient, compact stowed orientation of at least three wheels on such carrier devices. Inventors in wheeled cargo carrying device carts continually strive to achieve compact, convenient stowed positions of the devices so that they take up very little storage space. One invention disclosed for cargo carrying devices provides that a rear wheel frame, with at least two rear wheels, swivels in relation to a forward frame—and the swiveling or rotating motion of the rear frame synchronously operates to fold and stow the two rear wheels of the device. Further, in the operative position most similar cart devices feature a forward frame and a wheel oriented perpendicular to a rear frame which rear frame includes a pair of rear wheels. In each embodiment of this invention, the forward frame moves into a stowed orientation, closely adjacent to, and parallel with, the rear frame. In this stowed configuration, at least one forward wheel and the rear frame wheels are linearly aligned occupying a co-planar relationship, and are all parallel with the rear and the forward frame together forming one combined side elevational profile of the over-all compact, stowed carrier. The innovations are applicable to carrier devices, golf bag carriers, baby strollers, carts, dollies, and trolleys, and the innovations provide for an ultra-thin compact stowed profile of the wheeled carrier device.

BACKGROUND OF THE INVENTION

Applicant's prior U.S. patents include, but are not limited to U.S. Pat. Nos. 8,720,912; 8,613,463; 8,544,871 and 8,500,140 among many others. Many of applicant's inventions seek to achieve compact stowed golf carts or baby stroller wheel designs so that the consumer may conveniently fold the device when not in use, and the products each achieve a compact stowed position. In the preferred embodiments of this particular invention, the device has a three-wheel orientation, and simple movement of both the front wheel, and of the at least two rear wheels, provides for folding and compacting of the wheels, without their removal, and results in the ultra-thin stored profile. In the above-mentioned previous U.S. Pat. No. 8,544,871, this inventor provided for synchronous folding of at least two rear wheels by virtue of at least one gear that synchronously caused movement and stowing of at least two rear wheels when a portion of the wheeled carrier device frame was folded. This application builds on the concept of synchronously folding at least two rear wheels of a wheeled carrier device, however; the synchronous folding of the at least two rear wheels is accomplished by either: 1) a unique swiveling motion of the rear wheel frame in relation to the forward wheel frame and/or the upper frame; or 2) the rotation of the forward frame in relation to the rear frame, however, unlike the foldable carrier devices of the prior art, this cart device achieves a stowed status of the forward and the rear wheels in a linear alignment, where each of the wheels' axis of rotation are co-planar and closely adjacent to the rear, forward and upper frame stowed parts. Further, this invention does not have a gear which transfers the synchronous motion (like the applicant's prior art) but instead uses a series of linkages and connectors between the rear wheel frame and the other frame parts, and the rotation motion of the rear frame in relation to the remaining carrier parts is what provides for the synchronous folding and set up of the at least two rear wheels.

SUMMARY OF THE INVENTION

This application provides for compact, ultra-thin profiles for wheeled carts, such that none of the wheels need to be detached, but can be simply manipulated into an orientation which situates all the folded wheels axis of rotation into co-planar relationship with a forward and rear frame, conveniently providing for a compact device, and simple reversing movements of the wheels from their stowed position allows for their operative position set up.

One of the purposes of this invention is to provide for a forward frame and wheel that may be swept through an angle, into a compact orientation, closely adjacent to the rear wheel frame, and reversing motions allow for the setup of the same wheel.

One of the purposes of the invention is to provide for an extensible and retractable wheel arm for the forward wheel that is conveniently turned, and retracted into a compact forward wheel position, without wheel detachment. In a second embodiment, the forward wheel is not retracted, but is swept through an angle into a co-planar relationship with the device wheels.

Another purpose of the invention is to provide for a simple manually manipulable latch which allows for release of the operative position of the forward wheel, allowing it to be simply rotated along a guide channel so that the wheel may be easily stowed and can only be stowed by the user in one manner during the stowing motion.

Another object of the invention is to provide for a simple mounting bracket for a forward wheel of a carrier device, which provides a guide channel incorporated into the forward frame mounting bracket, to allow the extension and retraction of the forward wheel, and which provides a latching means within the mounting bracket for said forward wheel.

Another object of the invention is to provide that the mounting bracket on the forward wheel frame also includes cargo retaining means that are oriented into the mounting bracket of the forward wheel frame.

Another object of the invention is to provide for an upper frame of a wheeled carrier device that includes at least one upper stage in addition to a lower stage, which may be manually manipulated to various ergonomically advantageous positions to accommodate different height users.

Another object of the invention is to provide that the upper frame includes a handle grasp, and a portion of the upper frame, in the operative position, is retained to a portion of a lower frame by gravitational or resilient forces, and the same upper frame achieves a stowed compact position where the two upper frame stages become co-planar to one another in the collapsed state of the device.

Another object of the invention is to provide that the forward wheel frame includes a mounting bracket on which the rear wheel frame and at least two rear wheels are mounted.

Another object of the invention is to provide that at least two rear wheels and a rear mounting frame may be mounted to a forward wheel frame, and the rear wheel frame swivels or moves along an interconnection assembly (or a synchronous folding assembly) which facilitates motion that synchronously folds the rear wheels from an operative position to a fully stowed position where the rear two wheels, when stowed, are co-planar to each other and are parallel with the forward and the rear wheel frames, and a rear wheel frame finger grasp may be provided to facilitate easy swiveling of the rear wheel frame between the stowed and the operative positions.

Another object of the invention is that when the user manually moves either of the two rear wheels to achieve their stowed position, a series of linkages and joints synchronously sweep the position of each of the two rear wheels from the operative to the stowed position, and vice-versa, by the simple 90-degree swiveling or folding of the rear wheel frame, either clockwise, or counter-clockwise, in relation to the forward frame of the device to which it is movably secured. Similarly, another embodiment provides that the rotational motion of the forward frame in relation to the rear wheel frame provides the synchronous folding and unfolding of the rear wheels through a series of linkages between the said parts.

Another object of the invention is to provide for a rear wheel frame interconnection assembly, which is mounted to a portion of the front wheel frame mounting bracket, and the assembly has a series of linkages to a series of sliders mounted on the rear wheel frame, and the sliders further connect to a movable joint attached to each of the rear wheel axles, so that when the rear wheel frame is swiveled 90 degrees along the interconnection assembly securing point, it synchronously turns each of the two rear wheels, in tandem, from an operative wheel position perpendicular with the rear wheel frame to a stowed position wherein the two wheels and the entire rear wheel frame are substantially parallel with the rear wheel frame and closely contiguous to same, and reversing movements also synchronously move the rear wheels and the rear frame from the compact, stowed position to the fully operative, in use position.

Another purpose of the invention is to provide that the rear wheel frame interconnection assembly may be swiveled in a single direction, so that the user can only accomplish the folding, or the set up, of the rear wheel frame in the proper intended direction, or alternatively, the rear frame may instead be movable from an operative orientation perpendicular to the longitudinal direction of the forward frame, with the rear wheels in the operative status, to a rear frame stowed orientation co-planar and parallel to the forward frame, with the rear wheels folded closely adjacent the rear frame, aligning each rear wheel and the forward wheel's axis of rotation in alignment closely adjacent and along the longitudinal plane of the forward frame.

Another purpose of the invention is to provide that simple rotational movement of the forward wheel frame causes synchronous motion to be transferred by a series of linkages to rear wheels and the rear wheel frame, so that the folding motion of at least the forward frame and forward wheel in relation to the rear wheel frame, synchronously folds and stows the rear wheels, as well as the rear wheel frame, so that all wheels are co-planar and linearly aligned when stowed, closely adjacent to the forward frame, and in addition, closely adjacent to the upper frame forming a hand grasp. This and other portions of the innovations are further outlined in this application.

BRIEF DESCRIPTION OF THE DRAWINGS

FIG. 13 is an underside plan view of the rear wheel frame partially swiveled between the operative and stowed positions showing the swivel assembly components and each of the rear tires in an intermediate position, and showing the forward wheel in a fully stowed position.

FIG. 14 is underside plan view of the fully stowed carrier device with all wheels in their stowed positions, co-planar, and with the rear wheels and rear frame in a parallel configuration with the forward frame creating a thin stowed profile;

DESCRIPTION OF THE PREFERRED EMBODIMENTS

Figure 1:
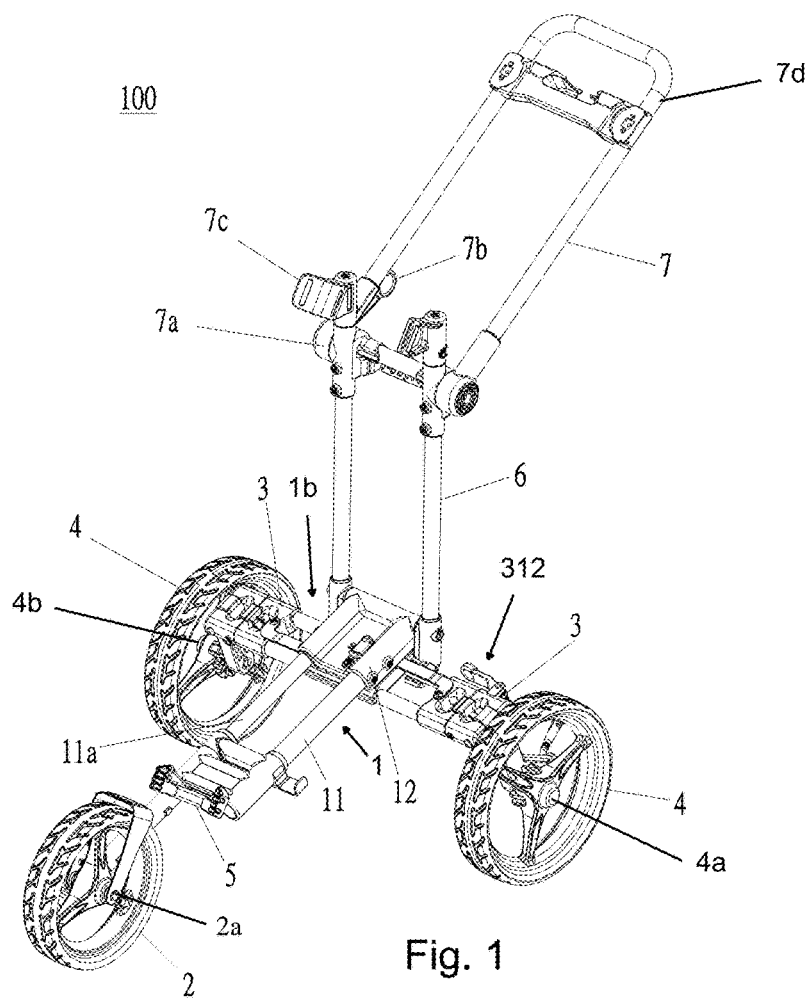
FIG. 1 is a perspective of a carrier device, in accordance with one aspect of the present invention, in a fully operative position including a view of the forward frame, the rear frame, and the lower and upper stages of the upper frame, this figure, along with FIG. 2 beside it, are the preferred cover drawing figures.

Referring to the drawing figures the following are the description of the numbered elements: 100 carrier device cart embodiment; 101 simplified alternate carrier device cart embodiment; 1 forward frame; 1a front forward portion; 1b rear portion; 2 front wheel; 2a front wheel axle; 3 rear frame; 4 rear wheel; 4a 4b rear wheel axels; 5 front frame cargo retaining means; 6 lower stage of upper frame; 7 upper stage, of upper frame; 7a upper frame connection joint; 7b upper frame adjustment means; 7c upper frame cargo retaining means; 11 forward frame arm; 7d push-pull handle grasp; 11a front wheel arm variation; 12 forward frame mounting bracket; 31 rear frame mourning arm; 32 rear frame mounting bracket; 32 aswivel assembly; 51 front wheel movable wheel arm; 51a front wheel fixing mount; 52 front wheel mounting bracket; 53 front wheel arm securing means; 54 manually manipulable latch; 55 latch resilient retaining means; 56 front wheel mounting bracket securing means; 311 rear frame wheel mount; 312 lateral plane of rear frame portion; 321 swivel assembly guide channel; 331 swivel assembly linkage; 332 rear frame slider; 333 rear wheel movable linkage; 334 rear wheel mounting axle; 335 wheel axis of rotation; 338 fixation member; 339 swivel assembly securing member; 340 rear frame swiveling finger grip; 341 movable parking brake; 342 upper to forward frame linkage; 343A forward to rear frame linkage A; 343B forward to rear frame linkage-B; 511 front wheel arm male-female guides; 521 front wheel bracket shaped guide channel; 521a front wheel bracket shaped guide latching channel; 521b front wheel mounting bracket movable wheel arm receiving means; 522 forward frame slider ring; and 523 side elevational profile.

FIG. 1 shows the preferred wheeled carrier device cart 100 in the fully operative position. In this preferred embodiment there is a single forward wheel and 2 rear wheels. It is appreciated that a different number of wheels may be utilized on the rear wheel frame or a double wheel configuration may be included on the forward wheel frame. The carrier includes a front wheel frame 1 to which at least a single forward wheel 2 is attached, which front wheel is mounted along a retractable and extensible movable wheel arm 51, as explained below. The wheeled carrier includes a rear wheel frame 3 which is movably secured to the forward wheel frame bracket 12, with a rear frame mounting bracket, 32 (shown more clearly in FIG. 11). As explained in other figures, the rear wheel frame, 3, is movably mounted to the underside of the forward wheel frame bracket 12 and the rear wheel frame includes a swiveling assembly 32-A (see FIGS. 10 and 11 for full detail) so that the rear wheel frame 3, and the wheels 4, for stowing purposes, swivel 90 degrees and the swivel motion synchronously also folds each of the rear wheels 4 into a compact figuration where the rear wheels and the rear wheel mounting frame 3 are stowed parallel with the other forward frame components and each wheel's axis of rotation 335 is also in a parallel configuration with the forward wheel frame. In the operative position, all of the carrier device wheels, and their axis of rotation, are orthogonal to the forward frame 1. The device includes an upper frame 7 which includes a hand grasp (any suitable part of terminal portion of the upper stage 7 may serve as a handle gripping portion or portions), and may include 2 separate stages, 6 and 7, and a manipulable joint 7-A, which is secured and released by any suitable latching structure, shown as 7-B. Any suitable cargo retaining means may be included as a part of the upper frame, here shown as 7-C that may include a flexible strapping system although any securing means may be employed. Additionally it is noted that the upper frame is maintained in the upright position by a gravitational connection between a portion of the lower stage of the upper frame, 6, and a portion of the rear wheel frame 3, because the preferred upper frame position is inclined away from the center point of the device, and any suitable shape may be included on the lower stage of the upper frame in order to retain contact between the lowest portion of the lower stage of the upper frame and a portion of the rear wheel frame 3. Any additional suitable cargo retaining means may be included along the forward wheel frame, for example as shown at 5. This may take the form of any suitable protrusion or flexible fabric may be included to assist with retaining cargo, luggage or any other attachment that holds cargo or even a portion of a baby stroller inserted into a receiving portion of the device that may retain a child or baby.

Figure 2:
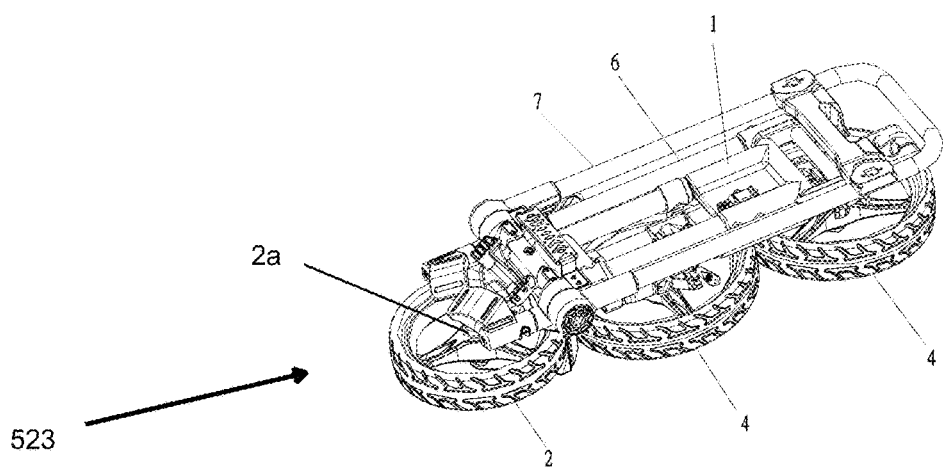
FIG. 2 is an underside plan view of the fully stowed carrier device of FIG. 1 showing each of the frame parts in a parallel configuration and all of the stowed wheels in a co-planar configuration.

FIG. 2 is a top plan view of the fully folded wheeled cargo carrier 100 where the upper frame parts, stages 6 and 7, have been released and are folded flat in a parallel profile along with the forward wheel frame 1, creating a single side elevational profile of the compact, stowed product. As shown in greater detail in other figures below, the forward wheel 2 mounted on the movable wheel arm 51 has been unlatched from its secured position, rotated along the fixed position forward frame arm 11, preferably 90 degrees, and then by virtue of a series of guide way protrusions or recesses (see FIGS. 5-7), the forward movable wheel arm 51 slides inside a guide channel 521 that is formed as a portion of the forward wheel mounting bracket 52 which permits retraction of the forward wheel 2 for stowing purposes.

As shown in further detail elsewhere, to achieve the fully stowed position shown in FIG. 2, the fully operative rear wheels and the rear wheel frame are swiveled preferably 90 degrees in a counterclockwise motion and this motion synchronously begins to turn each of the rear wheels 4 and the rear wheel frame 3 from a position perpendicular to the forward main frame, (not shown in this figure, shown more clearly in FIG. 10) the wheels and the rear frame swivel begin to turn (see FIGS. 12 and 13 showing intermediate swiveling positions) to the position parallel with the forward frame as shown in FIG. 2, where the rear frame and both rear wheels are co-planar with the forward wheel in a fully compact status of the device.

Figure 3:
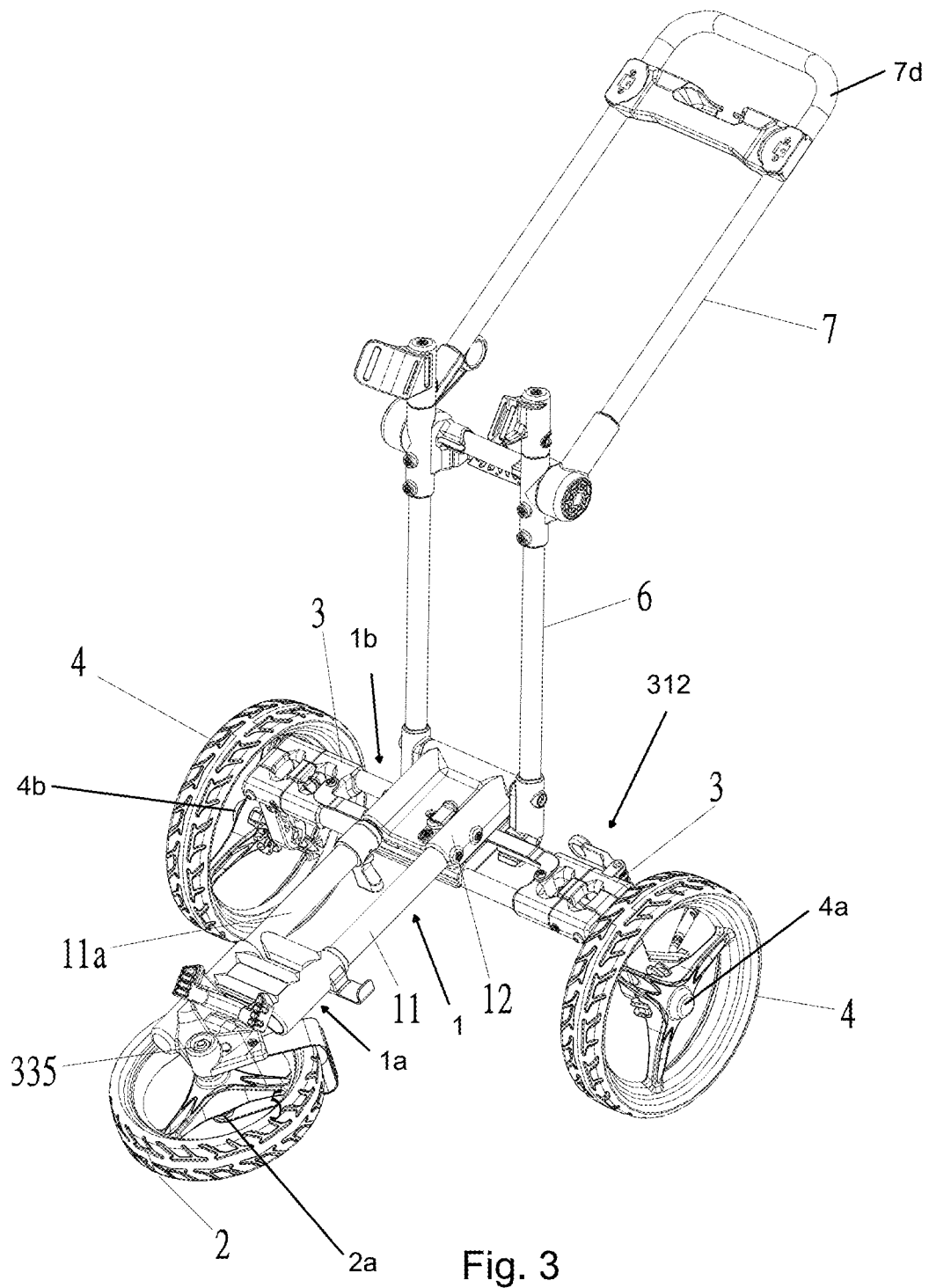
FIG. 3 is a slightly elevated view of the carrier device, similar to FIG. 1 with the one change being the forward wheel has been released from its operative position and the movable wheel arm has been retracted along the forward frame toward the rear frame.

FIG. 3 is similar to FIG. 1 except that the forward wheel 2 has been released from its secured position by virtue of the user manipulating a release latch 54 (See FIG. 5) which allows the rotation of the forward wheel 2 preferably 90 degrees. Once the user turns the forward wheel 90 degrees, it may be retracted within and through a shaped guide path 521 formed as a part of the forward mounting bracket 52 and further along a shaped portion of the forward wheel frame that the preferably tubular forward movable wheel arm 51 then travels over (travels around and over a portion of the fixed forward wheel arm 11) to achieve the fully retracted stowed position shown here in FIG. 3. The details of the manner in which the forward wheel is released, and travels down a guide channel, to the fully stowed position, is detailed in FIGS. 4-9 discussed later.

Figure 4:
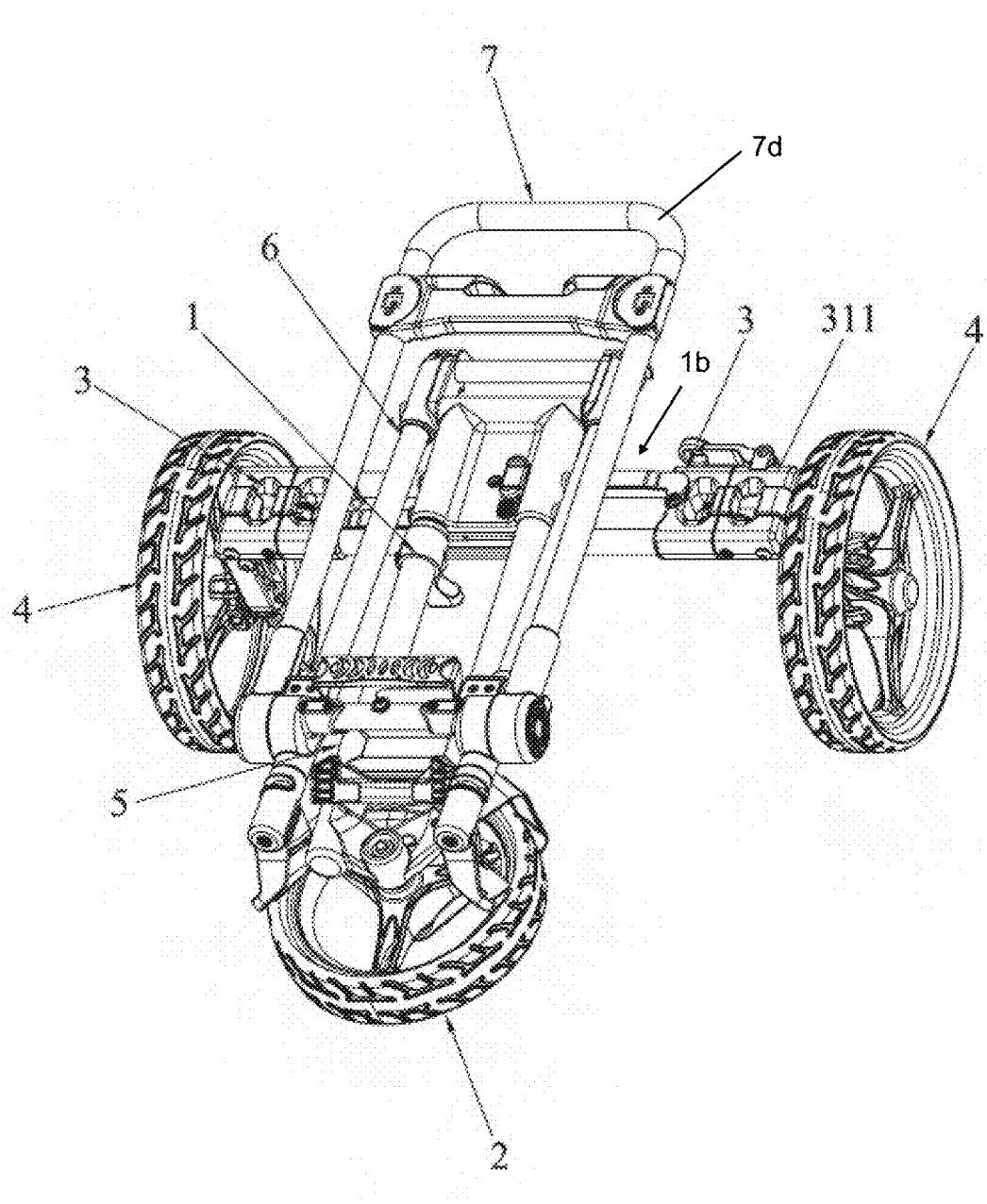
FIG. 4 is an end elevational view, slightly elevated, indicating that the upper and lower stages of the upper frame has been folded down into a configuration contiguous to, and parallel with, the forward wheel frame.

In FIG. 4, and in conjunction with FIG. 3, the wheeled carrier device 100 shows that the upper frame two stages have been released by using release latch 7-B which releases the joint at 7-A between the upper stage 7 and the lower stage 6 of the upper frame allowing the lower stage 6 to move downwardly in the direction of the forward wheel, and next in sequence the upper stage 7 folds to the collapsed status of the upper frame so that it is stowed parallel with and in the side elevational profile along with the forward wheel frame as shown in FIG. 4.

Figure 5:
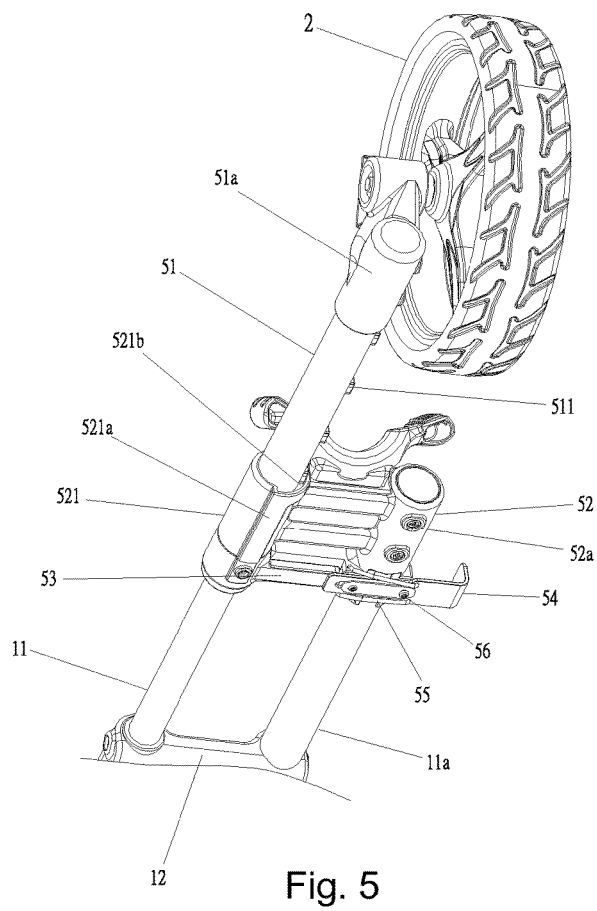
FIG. 5 is an underside view, cut away, of the forward wheel frame and the front wheel movable wheel arm including portions of the forward wheel mounting bracket.

FIGS. 5-9 show the details of the mounting of the forward movable wheel arm 51 along the forward wheel frame 1 and the method by which the front wheel 2 is extensible and retractable. Referring first to FIG. 5, the forward wheel 2 is secured to the fixed wheel movable wheel arm 51 by virtue of a securing mount 51-A. The forward wheel 2 is extensible and retractable along the fixed wheel movable wheel arm 51 which travels through a shaped guide 521 that forms a shaped opening portion of the front wheel mounting bracket 52. The front wheel bracket 52 is secured to at least one shaped portion of the forward frame 1 by at least one front wheel mounting bracket fixing means, 52-A. Also a portion of the forward frame mounting bracket 52 includes a shaped recess (Of course any suitable male/female system may be utilized; e.g., rather than a recess it may be a protrusion interaction with the front wheel arm 51). In this preferred embodiment of a latch, the latch 54 moves by means of resilient tension created by any suitable flexible material which resiliently retains the latch 54, urging it towards the center point between the two forward arms 11 shown in FIG. 5. A manually manipulable portion of the latch, 54 is secured to a portion of the front wheel frame as shown at 55. A portion of the fixed wheel movable arm 51 is retained in a suitable receiving portion of the front wheel mounting bracket 52 as shown at 53 in FIG. 5. When the user manually manipulates the latch 54 and frees the portion 53 connected to the front wheel movable arm 51 by rotating the front wheel 90 degrees, a series of protrusions, 511, along an aligned plane along the movable wheel arm 51 are then oriented into an alignment that allows the front wheel movable wheel arm 51 to be retracted inward toward the center point of the device. There are at least two specially shaped portions of the forward frame mounting bracket 52 that permit the extension and retraction of the front wheel movable wheel arm 51.

Figure 9:
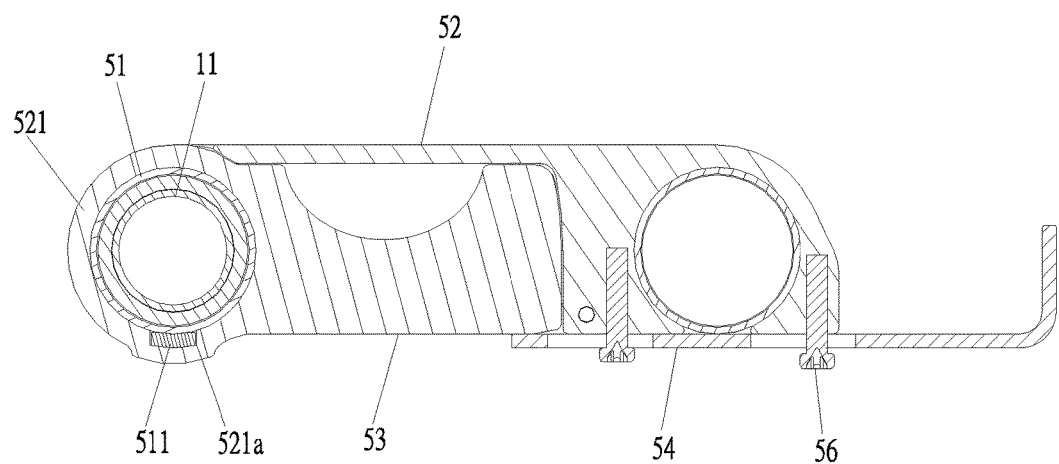
FIG. 9 is an end elevational axial view of the front wheel mounting bracket, cut away for this depiction, also showing the latching protrusion that forms a part of the forward wheel movable wheel arm, allowing for its retraction, extension and securement along the front wheel frame.

Referring to FIG. 9, the front wheel arm securing means 53 are shown in a secured position within a receiving portion of the forward frame mounting bracket 52. Also FIG. 9 shows the latch 54 and the securing means 56 and how a portion of the latch 54 retains the front wheel arm securing means 53 until the latch 54 is retracted, which allows this front wheel movable wheel arm 51 securing means 53 to be rotated preferably 90 degrees in preparation for retraction of the front wheel movable arm 51 also shown in FIG. 9. The front wheel movable arm 51 travels inside a shaped portion of the mounting bracket shown at 521-a. A series of protrusions along the movable wheel arm 51 are noted as 511 in FIG. 9 and are also clearly shown in FIG. 5.

Figure 6:
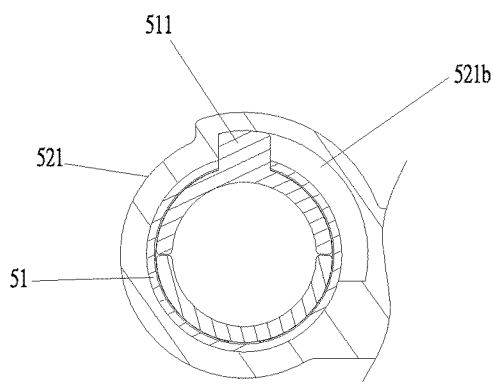
FIG. 6 is an axial view along the front wheel movable wheel arm, cut away for a perspective, showing the front wheel bracket shaped guide path.
Figure 7:
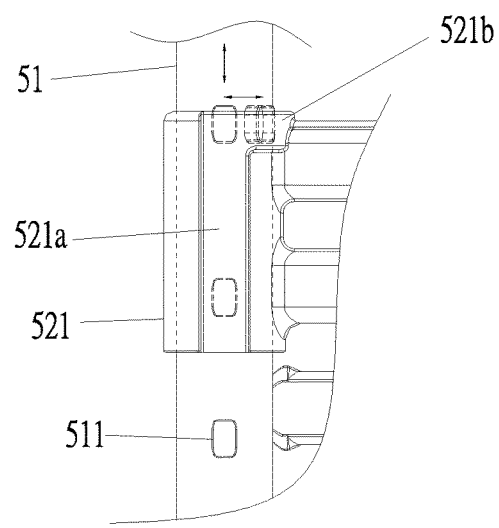
FIG. 7 is cut away side elevational view of the front wheel movable wheel arm, including the series of protrusions which interact with the front wheel bracket shaped guide path retraction and extension channel.
Figure 8:
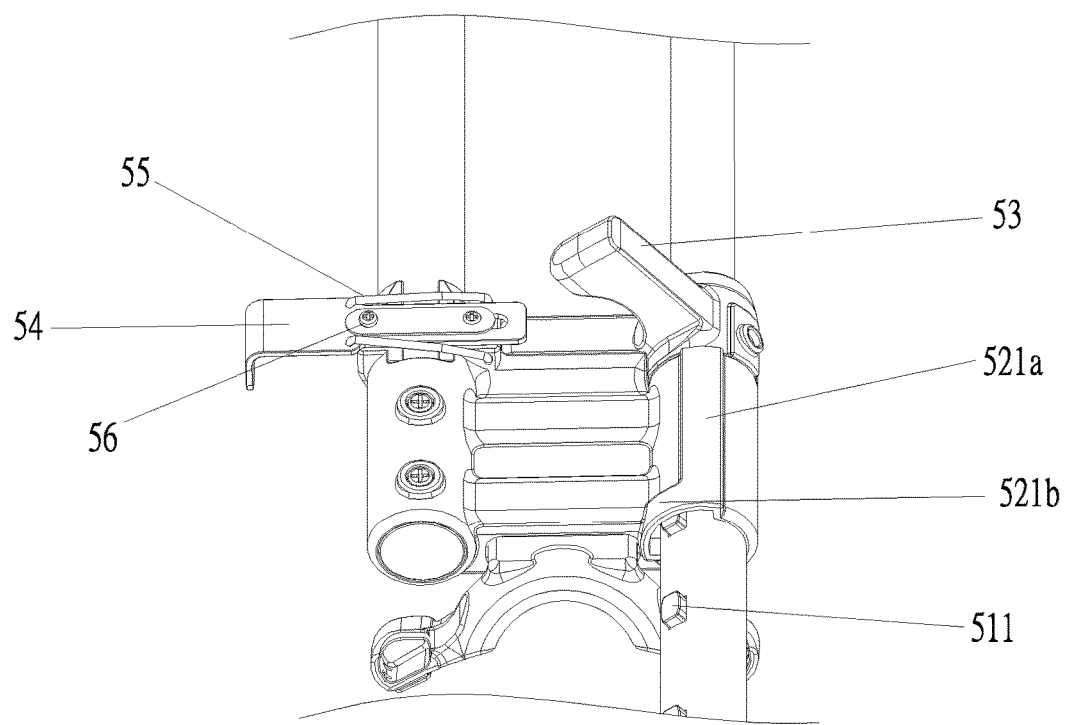
FIG. 8 is a view similar to FIG. 5 except a latching portion of the front wheel movable wheel arm has been rotated 90 degrees out of a receiving portion of the front wheel mounting bracket, and a series of protrusions along the front wheel movable wheel arm are in alignment with a receiving channel forming a slide path or guide way.

A series of guide channels are shown in FIGS. 6 and 7 that guide the extension/retraction and rotation of the movable forward wheel arm 51. Once the forward wheel, 2 is released from its secured position and rotated 90 degrees the series of guide protrusions 511 must be oriented into alignment with the channel, 521-b as shown in FIG. 7 in order to successfully retract the forward wheel movable arm 51. After the rotation above mentioned, the movable wheel arm 51 is retracted through the shaped portion of the mounting bracket guide channel at 521-a, and the series of protrusions 511 retain the front wheel 2 in the folded orientation as shown in FIG. 4. This retraction and extension orientation is shown in FIG. 7 and prevents the user from accidentally or improperly turning the stowed wheel in any fashion except to retract it in the stowed position (it is appreciated that the system can be reversed and that there can be recesses along the movable wheel arm 51, and protrusions may be formed in a guide way or guide path channel). In extending the forward wheel 2 from the stowed position the user can only move and extend the front wheel and the front wheel movable wheel arm 51 along the same plane the wheel was in when it retracted, to return it to the fully operative position and, in addition, the user cannot turn the front wheel 90 degrees back to the operational position until it is fully extended. The same channel and male/female protrusions that travel inside the channel 521-a prevent the forward wheel 2 from being placed in the operative position where it is orthogonal with the forward wheel frame until it is fully extended, at that point the movable wheel arm 51 is rotated which allows at least one protrusion 511 to rotate in the open shape 521-b which is isolated in FIG. 6 and FIG. 7. Only when fully extended, can the wheel arm 51 be turned 90° and then a portion of that forward wheel movable arm, shown at 53, rotates into the receiving channel 53 that further secures and latches the wheel 2 against unintended movement.

Figure 10:
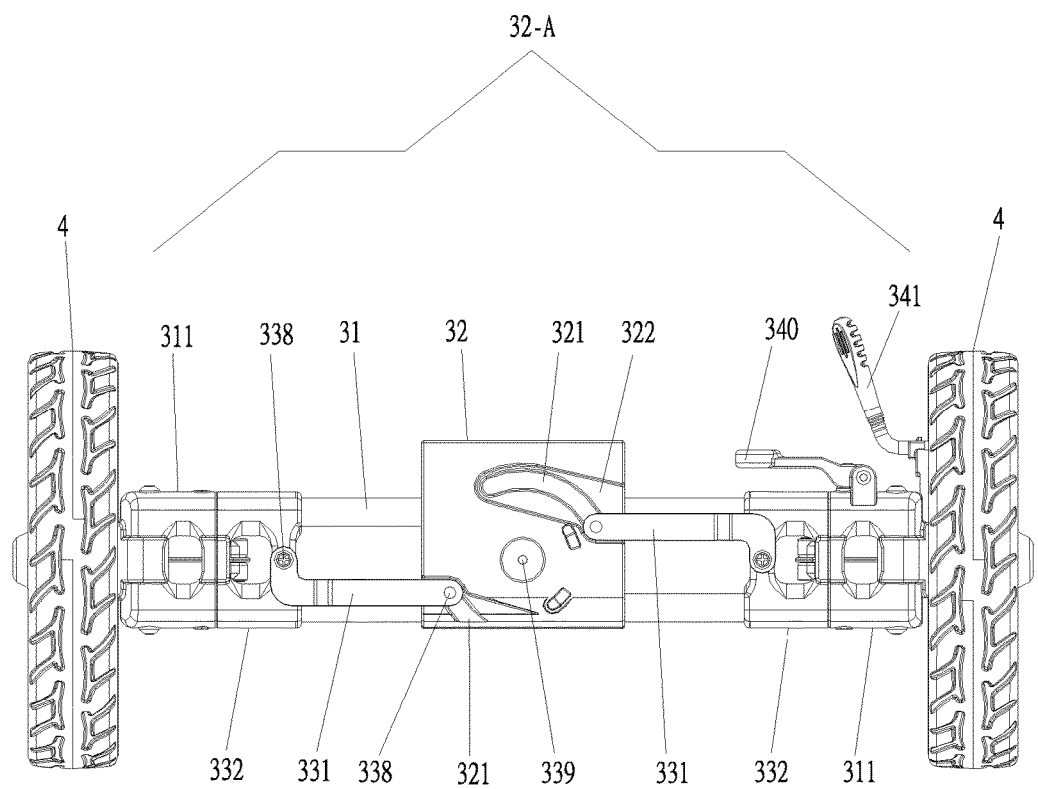
FIG. 10 is a top plan view of the rear wheel frame and its swivel assembly, partly cut away to improve the view of the component parts, which parts cooperate to synchronously swivel in relation to the front device frame, and the swiveling provides for the stowing and/or setup of each of the two rear wheels and the rear frame in a synchronous manner.
Figure 11:
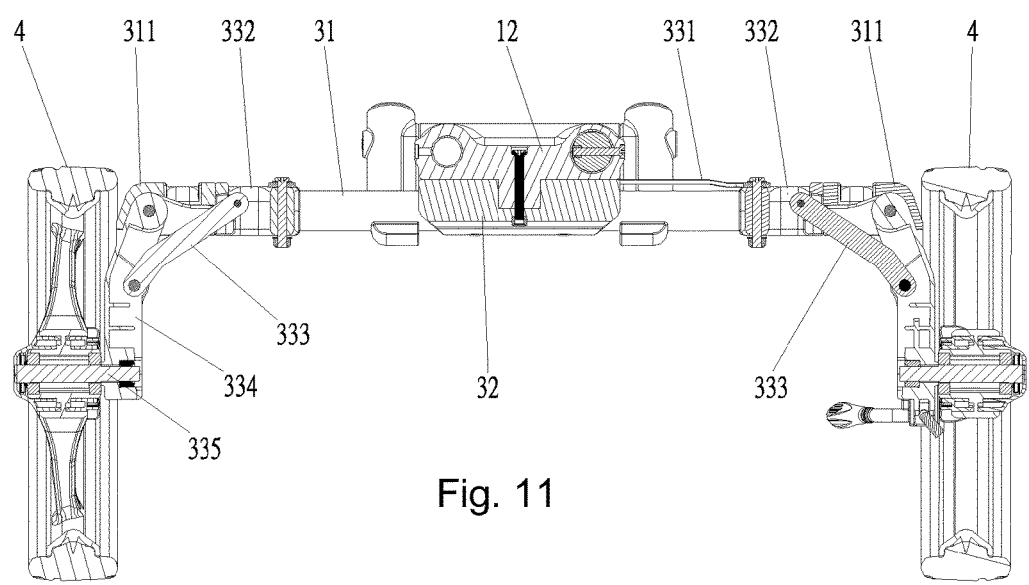
FIG. 11 is an end elevational view of the rear wheel frame and component parts interconnecting the rear wheels with the swivel assembly which components synchronously provides for setup and folding of the rear wheels and the rear wheel frame.

FIG. 10 is the first figure detailing a new state of the art innovation of the swiveling rear wheel frame 31 and the method by which a swivel assembly 32-A permits both of the rear wheels and the rear frame 31 to be synchronously moved along the rear frame mounting bracket 32, counter-clockwise 90 degrees, to achieve a fully stowed position of the rear wheels. Referring to FIG. 10, the drawing shows a rear frame mounting bracket 32 which is movably secured to the front wheel frame mounting bracket 12 by virtue of a securing member 339, which interconnects the rear frame 31 and the overall swivel assembly 32-A to the bottom portion of the forward frame mounting bracket 12 (only partially shown in FIG. 10.) This rear frame mounting bracket 32 movable mounting method permits the entire rear wheel frame mount, including the at least two wheels 4 to swivel at least 90 degrees along the rotatable or swiveling mounting means 39. Moving left and right from the central rear frame mounting bracket 32 in FIG. 10, a set of at least 2 swivel assembly linkages, 331 connected by securing means 338 to the mounting bracket 32, and connected at the opposite end of the linkage 331 to a rear frame slider 332, which sliders are slidably mounted along the rear frame 31. Referring also to FIG. 11, the rear frame pair of sliders, 332 are further connected by a rear wheel movable linkage 333 which interconnects the slider 332 to the rear wheel mounting axle 334. Each of the rear wheels 4 are mounted to the mounting axle 334 and then secured near the terminal end of the rear frame by a rear frame securing wheel mount 311.

Referring to both FIG. 10 and more particularly to FIG. 11, swiveling the rear frame 31 preferably 90 degrees, causes the swivel assembly linkage 331 to pull the slider 332 inwards toward the center point along the rear frame, and this synchronously also pulls inwards the rear wheel movable linkages 333 which are in turn also interconnected to the rear wheel axle 334, to which the rear wheels are interconnected. Accordingly, as the rear frame is swiveled preferably 90 degrees, each of the rear wheels are thereby drawn in from the orthogonal position shown in FIG. 11 to the intermediate positions shown sequentially in FIG. 12, and then FIG. 13, where each of the rear wheels 4 are partially moved inwards toward the center point of the rear frame 31, and then to the completely stowed position showed in FIG. 14. In a completely stowed position, front wheel 2 and rear wheels 4 are linearly aligned with one another; and the front wheel axle 20 (axis of rotation) is parallel with both rear wheel axles 4a, 4b (axis of rotation).

Additionally, as shown in FIG. 10, rather than manually grasping either wheel 4, to move the rear wheels, the user may manually use a finger grip, 340 to assist in the rear frame swiveling motion to avoid the user having to actually handle or touch the wheel 4. FIG. 2 and FIG. 14 show the fully compact stowed status of the wheeled carrier device whereby all of the wheels of the device are co-planar, closely contiguous to and parallel with the front wheel frame and the upper frame in its folded compact status.

Although previously explained, and referring to all the previous figures, in order to fold and stow the carrier device the user follows this order of steps: fold down the handle on to the forward frame, unlatch the front wheel, rotate it 90 degrees, move it inwards fully, and finally swivel the rear frame and wheels 90 degrees, preferably using the finger grip which synchronously moves both the rear frame and rear wheels to the stowed position. This motion orients the at least 3 device wheels in a co-planar orientation, and parallel with the forward wheel frame, and with the rear frame and the upper frame stages all parallel with each other forming a compact side elevational profile. To unfold, the steps above are reversed. In the compact fully stowed carrier device status, the three wheel's axis of rotation are oriented substantially below the forward and upper frame and are parallel with said frames, and each of said wheels axis of rotation are substantially aligned co-planar with each other.

Figure 15:
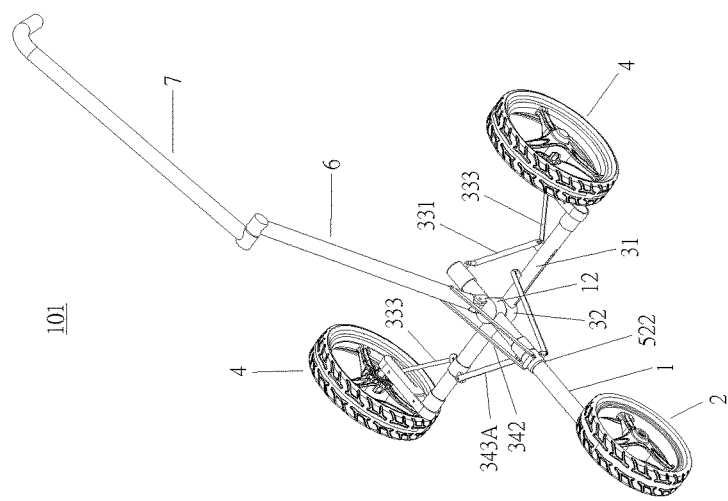
FIG. 15 is a bird's eye elevated view of simplified alternate wheeled cart device in accordance with another embodiment of the present invention, shown in a fully operative position.

FIG. 15 shows alternative foldable wheeled cart device 101 which is a more simplified embodiment of the carrier cart than device 100. Device 101 attains many of the fully stowed features similar to device 100, however, activation of the folding and unfolding process is accomplished differently. In embodiment 101, movement of the forward frame 90 degrees in one latitudinal direction activates the synchronous folding of the rear wheels, whereas embodiment 100 instead retracts the front wheel and forward frame inwards towards the rear frame, and separate manual swiveling movement of the rear frame causes the synchronous folding of the rear wheels. Accordingly, in device 101, latitudinally moving the forward frame in one 90 degree direction moves the at least one front wheel and the rear wheels into a co-planar folded profile, and reversed motion serves to setup the rear wheels and at least one front wheel. In cart device 101, all the stowed wheels and their axis of rotation are co-planar and linearly aligned, closely adjacent to the front, rear and upper frames in a single side elevational profile.

FIG. 15 shows the carrier in the fully operative position showing a forward frame 1 to which at least one front wheel 2 is attached, as well as a rear frame mounting arm 31 to which rear wheels 4 are movably mounted. Although a different number of stages may be included, FIG. 15 depicts an upper frame which includes a lower stage 6 and an upper stage 7 and the upper most terminal portion of the upper stage 7 forms a push/pull handle grasp. In alternative carrier 101 the series of linkages previously described in the application work similarly, but there are some differences, which can best be seen in the folding process shown in FIG. 16. As the stages of the handles 6 and 7, forming a part of the upper frame, are folded in a forward direction toward the operative front wheel 2, a series of linkages, 342 interconnect between the upper frame, lower stage 6, and a forward frame slider ring 522. The slider ring 522 is mounted around the periphery of the forward frame 1 and includes interconnected linkages between the forward frame 1 and the rear frame mounting arm 31.

Figure 17:
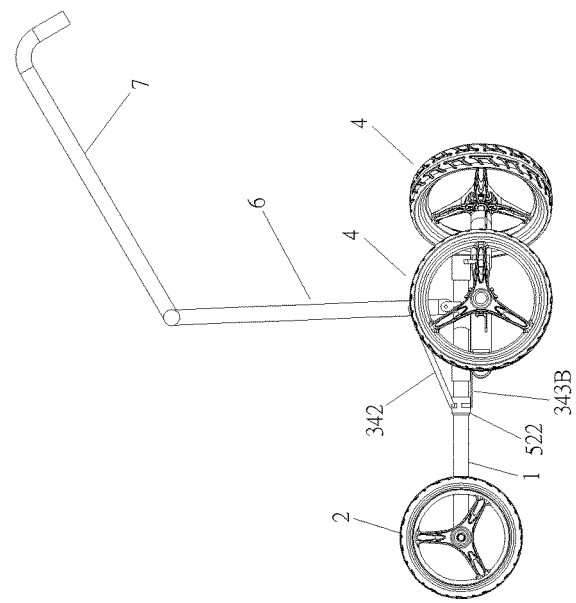
FIG. 17 is a side elevational profile view of FIG. 15 showing the similar folded position as in FIG. 16, where the rear wheels have begun rotation toward the stowed position.
Figure 16:
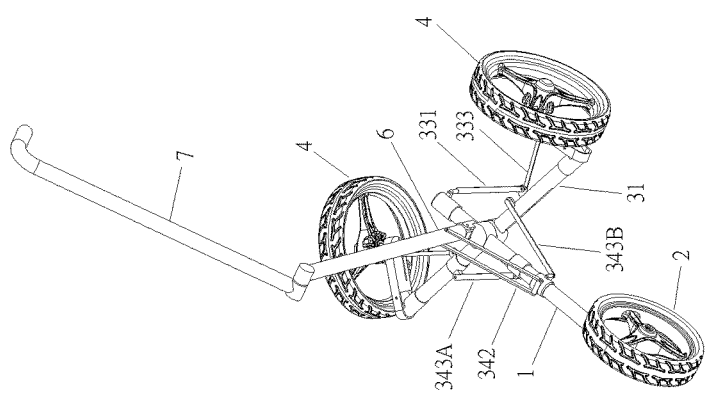
FIG. 16 is also a bird's eye slightly elevated view of carrier device of FIG. 15, showing an intermediate folding position where the upper frame is in the beginning stage of the folding the unit toward the fully stowed position.
Figure 18:
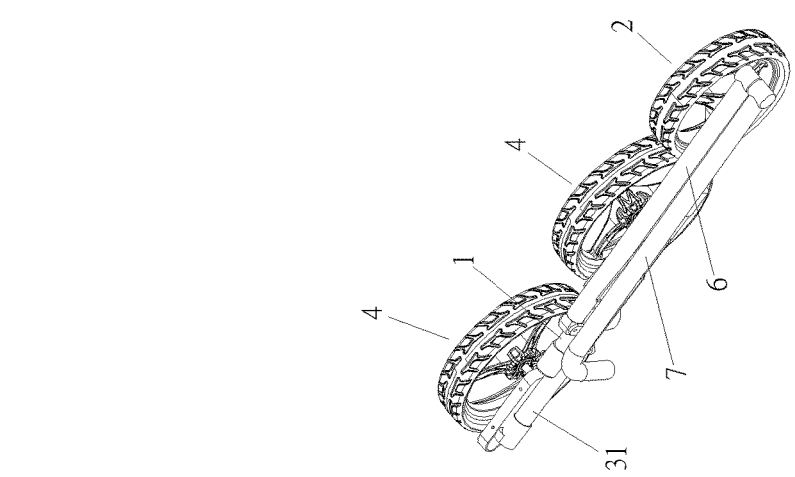
FIG. 18 is a side elevational view of the wheel carrier device of FIG. 15 shown in the fully folded status, with all wheels of the device in a co-planar position.

As seen in FIG. 16, as the upper frame handle folds forward, the multiple linkages 342 move a slider ring 522 along the upper frame, and one linkage between the slider ring interconnects to the rear frame mounting arm 31 as seen at linkage 343A. A second linkage, 343B connects between the forward frame sliding ring 522 and portions of the rear frame mounting arm 343B. The aforesaid interconnected linkages force rotation of the forward frame 1 in a counter-clockwise direction (as depicted in FIG. 16) ultimately rotating and swiveling the front wheel 2 to the fully stowed co-planar position with the other wheels of the device, as shown in FIG. 18, where the front wheel 2, and each of the rear wheels 4 are folded co-planar and parallel with the frame mounting arm 31. The front frame 1 and the two stages of the upper frame, 6 and 7, are also in a parallel stowed configuration with the aforesaid wheels as shown in FIG. 18. Of course, alternatively the forward frame and the linkages can alternatively be organized to have the forward frame instead fold clockwise (not shown). Referring to FIGS. 15-17, these figures show how other linkages synchronously fold the rear wheels into their fully stowed configuration as well. As the front wheel 2 and the front frame 1, move counter-clockwise during the folding process, as shown in FIG. 15, the linkage 343A is interconnected, along the rear frame mounting arm 31 to a rear wheel movable linkage 333. As the front frame and front wheel 2 move toward the fully stowed position by virtue of the movement of the upper frame stages 6 and 7, this movement also pulls the linkage 343A which is further interconnected to the rear wheel movable linkage 333 which synchronously folds one of the rear wheels between the operative position shown in FIG. 15, to the intermediate position shown in FIG. 16, and then fully folding it to the stowed position in FIG. 18. Likewise, the counter-clockwise folding motion of the forward frame 1 causes the other rear wheel 4 to fold in the following manner: a portion of the front frame 1 extends in a rearward direction past the transverse intersection with the rear frame mounting arm 31. Another linkage 331, mounted near the rear terminal portion of the front frame 1 links to a mounting slot along the rear frame mounting arm 31 (slot not shown in FIG. 16). The linkage 331 is interconnected to a rear wheel movable linkage 333 which interconnects with the rear wheel 4 as shown in FIG. 16. As the counter-clockwise motion of the front frame moves from the operative to the stowed position, the counter-clockwise motion of the rear of the front frame pulls on the linkage 331, and its interconnection to the rear wheel movable linkage 333, which moves at least one rear wheel 4 from the operative position towards its stowed position as shown in FIG. 18.

FIG. 17 shows a side elevational view of the carrier 101, providing a different perspective of the linkage from the upper frame 6 to the front frame 1 which is accomplished by a multiplicity of linkages 342 that are mounted to a slider ring 522 which is slidably mounted along the front frame 1. As shown in FIG. 17, when the lower stage of the upper frame 6 is moved forward, and the linkage 342 slides toward the front wheel, the interaction of the series of linkages above explained, forces the rear wheels toward their stowed positions in a synchronous fashion and, the front wheel mounted on the forward frame 1 also folds from the forward position, counter-clockwise, towards the fully stowed position shown in FIG. 18.

Figure 19:
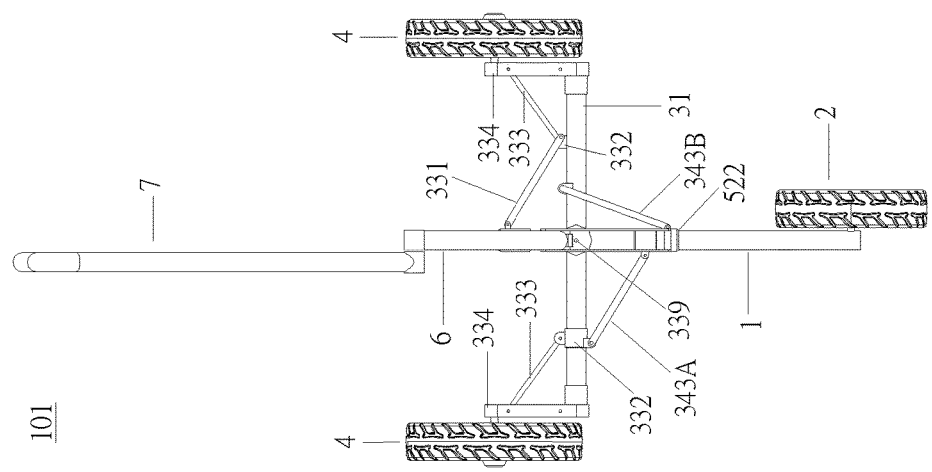
FIG. 19 is a top plan view the wheel carrier device of FIG. 15, shown in the fully operative position.

FIG. 19 is a top plan view of the fully operative carrier device 101, and the linkages can be seen more clearly here. Linkage 343A connects the slider ring 522 to one of the rear wheel movable linkages 333 which interconnect with the rear wheel mounting axle 334 and the rear wheel 4. In order to accomplish the innovation described in carrier 101, the other side linkages are slightly different to accomplish the folding motion, and therefore 343B interconnects between the forward frame slider ring 522 and portion of the rear wheel mounting arm 31.

Figure 20:
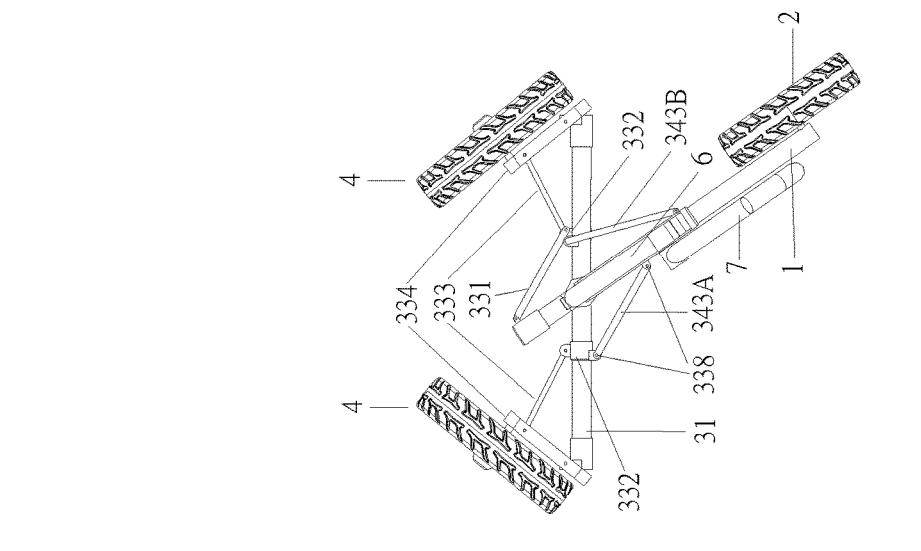
FIG. 20 is a top plan view of the wheel carrier device of FIG. 15, shown in the beginning stages of the folding process towards the stowed position, showing an intermediate status of the rear wheels as well as of the front wheel.

Referring to FIG. 20, which shows the intermediate folding position of the wheels, the front frame 1 is partially folded counter-clockwise towards the stowed position of the front wheel 2. During this motion it can be seen that the linkage 343A interconnects to the rear frame mounting arm 31 and to a rear frame linkage sliding member 332, which is slidable along the rear frame mounting arm 31. As the rear frame sliding member 332 pulls toward the center point of rear frame mounting arm 31, it interconnects with the linkage 333 which serves to pull one of the two rear wheels 4 towards its stowed position. FIG. 20 shows that on the other side of the rear frame mounting arm 31, the interconnected linkages are slightly varied from the other side. The front frame 1 slider ring 522, during the counter-clockwise folding motion of the front frame 1, pulls forward toward the front wheel 2 and a linkage is connected to the slider along the front frame 1 at 343B which connects to the rear frame mounting arm 31. However, also as seen in FIG. 20, a rearward facing stub portion of the front frame 1 has another linkage at 331 connecting near the terminal rear end of the front frame, specifically to a sliding or recessed area along the rear of the rear frame mounting arm 31 (although the sliding recess is not shown clearly in FIG. 20). The counter-clockwise motion of the rear portion of the front frame linkage 331 is interconnected with linkage 333, which is further connected to the other rear wheel 4, and as the front frame 1 is turned in the counter-clockwise motion, this causes the rear wheel 4 to move toward the fully stowed position which is shown in FIG. 21.

Referring to FIGS. 19-22, the movement between these figures demonstrates that the upper stage of the upper frame 7 has at least one joint connecting it to a lower stage of the upper frame 6 and referring back to FIG. 16, the intermediate position of the upper frame parts are shown at the beginning of the folding motion from the operative position towards the stowed position. In embodiment 101, the joint between the lower and upper stages of the upper frame moves toward the front wheel mounting position, as the parts are folded, placing the fully folded upper frame connecting joint close to the stowed position of the front wheel 2. The handle grasp of the upper stage 7, is adjacent and contiguous to the rear wheels 4 when in the folded and stowed position. This can be seen more clearly in FIGS. 21 and 22.

Figure 21:
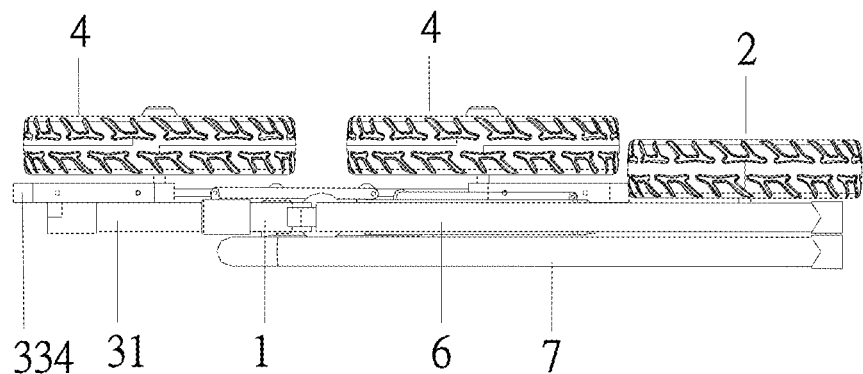
FIG. 21 is a side elevational view of the carrier device of FIG. 15 in the fully stowed position showing the co-planar view of the wheels of the device parallel with the frame portions.
Figure 22:
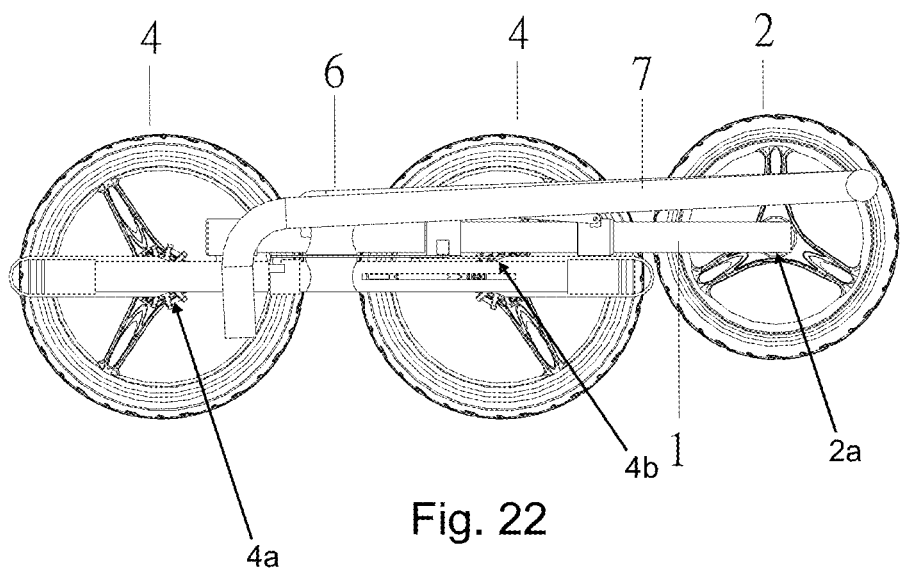
FIG. 22 is an underside plan view of the carrier device of FIG. 15, showing the folded frame portions.

To unfold the cart device 101 from the fully stowed position shown in FIGS. 21 and 22, the movement essentially is the reverse of that described above which accomplishes the unfolding synchronously, so that each of the wheels are moved from the fully stowed position shown in FIGS. 21 and 22 to the fully operative position shown in FIGS. 15 and 19. In the stowed position e.g. (FIGS. 21 and 22), the front wheel axis 20 and rear wheel axes 4a, 4b are substantially parallel to each other and front wheel 2 and rear wheels 4 are substantially linear with each other.

It is appreciated that a different number of wheels may be utilized without departing from the spirit of this invention. It is also appreciated that the inwards movement of the forward wheel arm in embodiment 100 may take on various shapes and orientations (including other folding methods, rather than extending and retracting), or that this may be accomplished by tubular or rectangular shapes of the extension and retraction channel and arm. Also, any suitable latching method may be utilized to retain the forward wheel arm of embodiment 100 in its operative, or in the stowed compacted position, and a different latching method may be employed. With regard to the upper frame stages 6 and 7 of embodiment 100 it is appreciated that an extensible and retractable upper frame may be included, where a single plane is utilized and a portion of the frames extend and retract in a single plane, rather than two separate stages of the upper frame with a movable joint as disclosed in this application. Further, without departing from the innovation of the movable rear frame (in either embodiment 100 or 101) it is appreciated that different folding or motion methods may be employed that accomplish the main purpose of moving the rear frame and the at least two rear wheels to the alignment which moves the rear frame adjacent to the forward frame, parallel with the forward frame and which causes the rear wheels to be folded co-planar with the forward wheel, whether by swivel, rotation, or manual manipulation of the rear frame and the rear wheels one at a time rather than synchronously.

What is claimed is:

1. A foldable wheeled cart, said cart comprising: a forward frame forming a plane in the latitudinal direction and forming a side elevational profile, wherein the forward frame includes a front portion and a rear portion; at least one front wheel movably mounted to the front portion of the forward frame; an upper frame movably mounted at its lower portion to the rear portion of the forward frame, forming a push-pull handle grasp at the upper portion of the upper frame; a rear wheel mounting frame including a swiveling interconnector at its center point which interconnects the rear wheel mounting frame to the rear portion of the front frame, further including at least two rear wheels, each rear wheel movably mounted at each of two opposite sides of the rear wheel mounting frame forming a rear frame plane in the latitudinal direction between the rear wheels in the same latitudinal plane of said forward frame; a plurality of linkages secured between an underside of the forward frame and at least two sliders, which sliders are movably mounted along the rear wheel mounting frame swiveling interconnector, and each slider is further interconnected to a movable rear wheel axle connected to each rear wheel, wherein, in a first operational position, each rear wheel provides rolling support to the wheeled cart, and in a second stowed position the rear mounting frame is swiveled ninety degrees along the swiveling interconnector, and the swiveling motion of the rear mounting frame in relation to the forward frame supplies rotational motion between the rear mounting frame and the forward frame which synchronously moves each of the at least two rear wheels from the first operational position to the second stowed position, where each rear wheel is parallel with the latitudinal forward frame plane and parallel with the at least one forward wheel and the at least two rear wheels are linearly aligned with the forward frame.

2. The foldable wheeled cart of claim 1, wherein the axis of rotation of the at least one front wheel, and the axis of rotation of each of the rear wheels are substantially linearly aligned closely adjacent to the latitudinal plane formed by the forward frame, when the front and rear wheels are in their second, stowed position, and said wheels are parallel with the forward frame's latitudinal plane.

3. The foldable wheeled cart in accord with claim 1, wherein cargo retaining means are included on the upper frame and the forward frame.

4. The foldable wheeled cart in accord with claim 3, wherein the cargo retaining means releaseably retain at least one golf equipment bag.

5. The foldable wheeled cart in accord with claim 1, wherein the upper frame is manually adjustable to a plurality of push-pull handle positions to accommodate the specific height of a user.

6. The foldable wheeled cart in accord with claim 1, wherein the at least one forward wheel is mourned to at least one movable support arm that is retractable and extensible along a guide channel formed along the forward frame, and a series of male-female protrusions and recesses provide manually selectable securement positions between the movable wheel arm and at least one portion of the guide channel, and when the at least one forward wheel is released from the operational position, the series of male-female protrusions guide the said front wheel towards the wheel's second stowed position, positioning the wheel parallel with the latitudinal plane of the forward frame in the stowed position, closer to the rear frame.

7. The foldable wheeled cart in accord with claim 1, wherein, at least one rear wheel is supplied with a manually adjustable parking brake which is selectively adjustable to prevent rolling movement of the rear wheel along a rolling surface in an engaged position of the brake, and in a disengaged position of the brake, rolling movement of the wheel is permitted.

8. The foldable wheeled cart in accord with claim 1, wherein a portion of the lower part of the upper frame is retained to a portion of the rear wheel mounting frame when positioned in said first operational position, and manual manipulation of the upper frame releases the upper frame permitting it to be folded to said second stowed position.

9. The foldable wheeled cart in accord with claim 6, wherein a securing portion of the front wheel movable support arm is retained to a portion of the forward wheel frame mounting bracket in a first, operative position, and manual movement of a latch releases the securing portion of the forward frame, and permits movement of the forward wheel between said first, operational position, and said second stowed position.

10. The foldable wheeled cart in accord with claim 1, wherein rotational motion of the forward frame in relation to the rear wheel frame supplies the synchronous motion which causes folding and unfolding of the rear wheels.

11. A foldable wheeled cart, said cart comprising: a forward frame forming a latitudinal plane and a side elevational profile; at least one front wheel mounted to the forward frame; an upper frame portion, including a push-pull handle; a rear wheel mounting frame occupying the same latitudinal plane with the forward frame, which rear wheel mounting frame includes at least two rear wheels; and a swiveling interconnector mounted to the center of the rear wheel mounting frame which interconnects the rear wheel mounting frame to the rear of the forward frame wherein a plurality of linkages are secured between the forward frame and at least one sliding portion, movably mounted along the rear wheel mounting frame, and the at least one sliding portion is further interconnected to at least one movable rear wheel axle connected to each rear wheel; and wherein the foldable wheeled cart has a first operational position in which said front and rear wheels are oriented for rolling movement of the cart, and the rear wheel mounting frame is oriented perpendicularly to the forward frame and a second, compact, stowed position, wherein the rear wheel mounting frame is swiveled along the swiveling interconnector ninety degrees along said latitudinal plane, which swiveling movement positions the axis of rotation of each of the rear wheels so that each rear wheel is substantially linearly aligned closely adjacent to the forward frame, and said rear wheels are in the stowed position parallel with the latitudinal plane of the forward frame; and the forward, rear and upper frames, in the second, compact stowed position are all substantially co-planar, along with each of said rear wheels, forming the side elevational profile.

12. The foldable wheeled cart in accord with claim 11, wherein cargo retaining means releasably retain at least one golf equipment bag.

13. The foldable wheeled cart in accord with claim 11, wherein in the first operational position, each rear wheel provides rolling support to the wheeled cart, and in the second stowed position the rear mounting frame is swept through an angle of ninety degrees, which motion of the rear mounting frame in relation to the forward frame supplies synchronous motion between the rear mounting frame and the forward frame which moves each of the at least two rear wheels from the first operational position to the stowed position, where each rear wheel is parallel with the latitudinal forward frame plane and the at least one forward wheel and the at least two rear wheels are linearly aligned closely adjacent to the forward frame.

14. The foldable wheeled, cart in accord with claim 11, wherein rotational motion of the forward frame, in relation to the rear wheel frame, supplies the synchronous motion which causes folding and unfolding of the rear wheels.

15. The foldable wheeled cart in accord with claim 11, wherein cargo retaining means are included on at least the upper frame and the forward frame.

16. The foldable wheeled cart in accord with claim 11, wherein cargo retaining means releasably retain at least one golf equipment bag.

17. The foldable wheeled cart of claim 1, wherein the axis of rotation of each rear wheel is substantially in the same plane when in the stowed position.

18. The foldable wheeled cart of claim 17, Wherein the axis of rotation of the at least one front wheel is in the same plane as the plane of the axis of rotation of each of the rear wheels when in the stowed positon.

19. The foldable wheeled cart of claim 1, wherein when in the stowed position, the at least one front wheel and the rear wheels are substantially linearly aligned with each other.

* * * * *